July 4, 1944. J. B. GOLDSBOROUGH 2,352,624
FILTER BED CLEANING
Filed Feb. 17, 1940

INVENTOR
J. B. GOLDSBOROUGH
BY Louis L. Ansart
his ATTORNEY

Patented July 4, 1944

2,352,624

UNITED STATES PATENT OFFICE 2,352,624

FILTER BED CLEANING

John B. Goldsborough, Croton on Hudson, N. Y., assignor to Underpinning & Foundation Company, Inc., New York, N. Y., a corporation of New York Application February 17, 1940, Serial No. 319,405

3 Claims. (Cl. 210—128)

This invention relates to filter bed cleaning in filtration of liquids and more particularly to improvements in filter bed cleaning means adapted to travel along the upper face of a downward-flow filter bed of granular material and remove the accumulated waste material from the granular filter-bed material, from the bottom to the top of said bed. The filter-bed-cleaner of the present invention is in general an improvement on the filter bed cleaner of the patent to Pruyn, No. 2,182,094, December 5, 1939.

Heretofore it has been the practice in certain filtration plants to maintain a filter bed of granular material such as sand, in condition for continuous operation by use of an overhead cleaning device, traveling along the upper surface of the filter bed.

In liquid purification, such as purification of sewage, a large proportion of the solids may be removed by settling and the supernatant liquid may then be filtered, for example, by passing it through a filter bed of granular material. The filter bed may be in a filter tank or channel which is divided by a filter bed into an upper portion receiving supernatant liquid from the settling tank and a lower effluent portion or chamber in which collects the effluent or liquid filtered by passage through the filter bed. The filtered liquid or effluent is discharged from the effluent chamber against a head which is sufficient to keep the effluent chamber full.

Certain cleaners heretofore in use include for each cleaner a caisson or chamber having an open bottom and engaging the upper surface of a filter bed so as to segregate the part of the filter bed beneath the caisson and enable cleaning of the granular material beneath the caisson. Across the interior of the caisson are arranged a plurality of hollow teeth having their lower ends adjacent the screen supporting the granular filter bed material and their upper ends above the upper surface of the filter bed inside said caisson. The sand or other granular material may be passed or pumped upwardly through the teeth in any suitable manner as by the use of fluid jets. In said patent to Pruyn, the upper ends of such hollow teeth are turned downwardly to direct the flow of sand downwardly toward the surface of the filter bed so that the sand discharged from the upper ends of the teeth will be deposited on the surface of the filter bed leaving the waste material washed therefrom, in the dirty water in said caisson.

The dirty water resulting from the cleaning of the sand should be withdrawn from the upper part of the caisson without carrying sand therewith. There may be considerable erosion in said downturned upper ends of the teeth and in other parts of said teeth, thus causing relatively rapid deterioration of said teeth and tending to cause the cleaner to be taken out of use in order to enable repair and replacement of parts. The prior cleaners also had other disadvantageous features.

An important object of the present invention is to provide novel and advantageous forms of filter-bed cleaners. Another object of the invention is to provide filter-bed cleaners by which one or more of the foregoing and other disadvantages of prior cleaners may be substantially eliminated. Another object is to provide a filter-bed cleaner in which the hollow teeth through which the granular material or sand from the bottom is passed upwardly are so shaped that the granular material passes through the hollow teeth in substantially straight lines thereby avoiding erosion of the sides of the passages in said hollow teeth. A further object of the invention is to provide means whereby sand discharged from the upper ends of such hollow teeth will be prevented from passing directly to the top of the caisson where the dirty water is passed out of the caisson.

The invention may be carried out by using substantially straight hollow teeth extending downwardly from the interior of the caisson to the lower part of the filter bed, and extending upwardly above the surface of the filter bed. The sand may be passed upwardly through the teeth by any suitable means such as upwardly directed fluid jets. The dirty water may be discharged through an outlet at the upper part of the caisson and, in order to obtain thorough washing of the filter bed material and at the same time prevent the passage through said outlet of granular material from the upper ends of said teeth, use may be made of deflecting means adapted to turn downwardly the stream discharged from the upper ends of said teeth and increase the length of the path followed by liquid flowing from the upper ends of the hollow teeth to the dirty water outlet, thus giving the granular material or sand time to settle on the top of the bed.

Other objects, features and advantages will appear upon consideration of the following detailed description and of the drawing in which.

Figure 1:
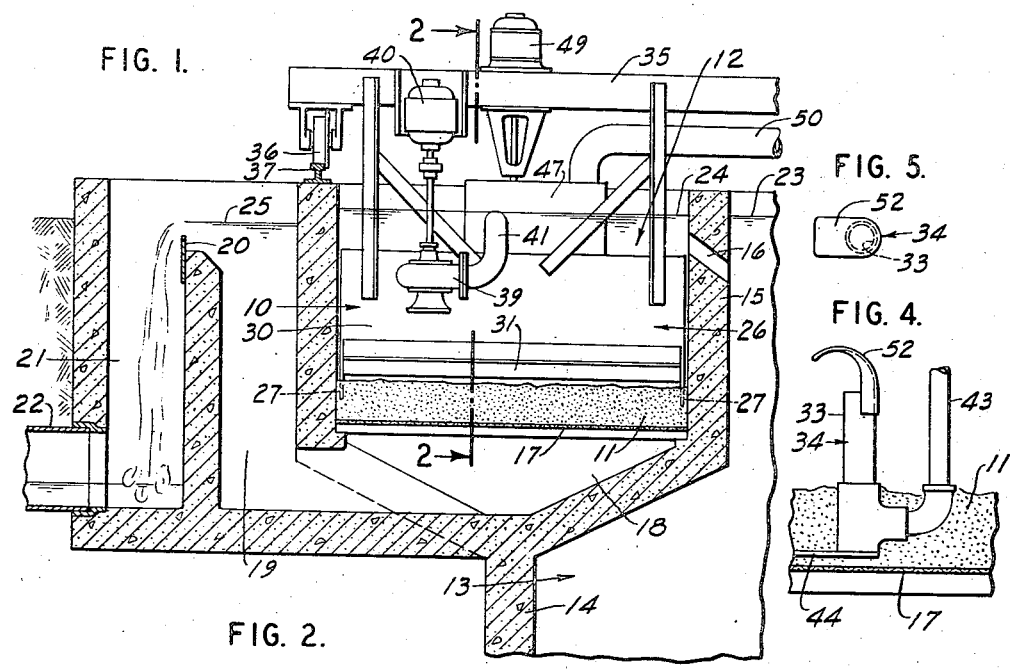
Fig. 1 is a fragmentary sectional view illustrating one form of filter bed cleaner embodying the present invention, in connection with the filter bed and filter channel of a prior form of apparatus.
Figure 2:
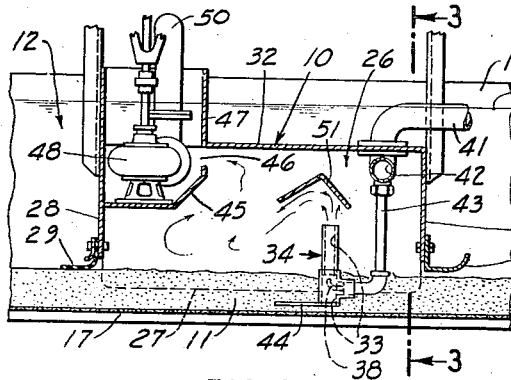
Fig. 2 is a section taken on the line 2—2 of Fig. 1.
Figure 3:
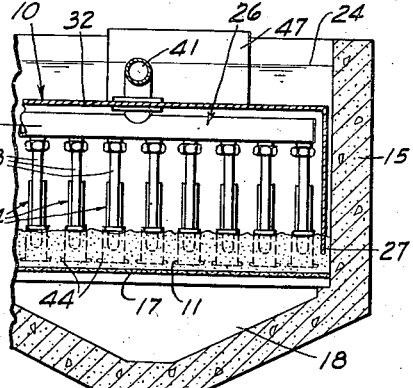
Fig. 3 is a section taken along the line 3—3 of Fig. 2.

For convenience the filter bed cleaners of the present invention will be illustrated as applied to apparatus of the general type disclosed in the patent to Streander 2,086,629, July 13, 1937. Referring to Figs. 1, 2 and 3 of the drawing, a filter bed cleaner 10, embodying one form of the present invention, is illustrated as arranged for cleaning a filter bed 11 in an endless filter channel or tank 12 at the periphery of a settling tank 13 having a peripheral wall 14. The filter bed is made up of suitable granular material such as sand.

In Fig. 1 the filter bed channel 12 is illustrated as mounted on said wall 14 and the interior of the filter bed channel is separated from the interior of the settling tank 13 by the inner wall 15 of the filter channel. The supernatant liquid in the settling tank may be admitted into the upper part of the filter channel 12 in any suitable manner, for example, through passages 16. These passages are inclined upwardly from the interior of the settling tank to the interior of the filter channel and the liquid levels in the two tanks may be maintained so that both ends of the passages will be submerged. Obviously the arrangement is such as to guard against the passage of scum from the settling tank to the interior of the filter channel.

It should be understood that the filter bed channel 12, although illustrated as mounted on the peripheral wall of the tank, might also be located either inside the tank or outside the same. It should also be understood that the filter bed cleaner may be used in tanks or channels differing in shape from the endless channel referred to hereinbefore, for example in a rectangular tank.

The filter bed 11 rests on a suitable support 17 such as a screen, and divides the channel 12 into an upper portion receiving supernatant liquid from the settling tank 13 and a lower or effluent chamber 18 receiving the filter liquid from the bottom of the filter bed. Said effluent chamber is maintained full due to the fact that the downward flow through the filter bed is effected against an effluent head sufficient to control the rate of filtration. From the effluent chamber 18, the effluent passes through one or more passages into the bottom of an effluent channel 19 from which the effluent may be discharged over a weir 20 into another channel 21 from which the effluent is directed through one or more ducts 22 to any desired destination.

The liquid levels in the settling tank 10, filter bed channel 12 and channel 19 may be as indicated at 23, 24 and 25, respectively, on Fig. 1.

The filter bed cleaner 10, which may be moved along the channel 12 by any suitable means, is illustrated in Figs. 1, 2 and 3 as comprising a caisson or chamber 26 open at its bottom which engages the filter bed 11 at its upper surface, and having side walls 27 projecting downwardly into the granular material of the filter bed to effect a substantial seal at said side walls. The caisson also comprises a rear wall 28 which may be provided at its lower part with a sheet member or flap 29, of any suitable material, riding on the upper surface of the filter bed and tending not only to smooth the part of the filter bed just cleaned but also to maintain a seal with the upper surface of the filter bed. At its front the caisson may be provided with a front wall 30 which at its lower edge is provided with a part or lip 31 of which the lower surface extends forwardly and then curves upwardly, thus serving to depress the granular materials and waste solids so that they will pass under said front wall. The lip 31 may be integral with said front wall or separate therefrom and secured thereto in suitable positions, and may be so positioned that liquid and solids may pass thereunder into the caisson. Preferably the caisson is provided with a top 32 and is submerged, thus avoiding the building up of a wave at the front of the caisson.

As viewed in Fig. 2, the cleaner 10, while in use, travels to the right. During this movement, some solid-bearing liquid enters the caisson under the front wall thereof and granular filter-bed material and accumulating contaminating solids are passed upwardly from the bottom of the filter bed 11 through passages 33 in suitable devices or hollow teeth 34, each of which extends from its upper end in the caisson downwardly to the lower part of the filter bed just above the screen or filter bed support 17. During the movement of the cleaner the teeth 34 act to rake and agitate the material of the filter bed 11.

The hollow teeth 34 may, as long as they take care of all the material throughout the width of the cleaner, be arranged in any suitable manner. As illustrated, there is a single row of hollow teeth 34 extending across the chamber or caisson. However, if the teeth were arranged too close together, the granular material or sand would be piled up before the teeth as they advance. Such piling up may be lessened or substantially eliminated by arranging the teeth in a plurality of successive rows and, if desired, in staggered position in said successive rows.

The cleaner 10 may be suspended from a bridge 35 pivotally mounted at the center of the tank 13 in a manner not shown and supported at its outer end by one or more wheels 36 carried thereby and resting on a rail 37 on top of the outer wall of the filter bed channel 12. The bridge 35 may be driven in any suitable manner, for example in the manner disclosed in said Streander Patent 2,086,629.

The structure thus far described may be in general similar to the structure heretofore in use except for the teeth 34 in which the passages 33 are substantially straight whereas corresponding passages in teeth heretofore in use such passages were not straight and the teeth were rapidly destroyed by abrasion. Although the teeth 34 are illustrated as being substantially vertical, it should be understood that their positions may be varied. The granular material may be passed upwardly through the teeth 34 by any suitable means such as upwardly turned fluid jets or nozzles 38 located in the passages 33 said teeth 34, preferably near the lower ends of said teeth. Fluid such as water may be drawn from the filter bed channel 12 by a pump 39 driven by a motor 40, both of which are supported by said bridge, and forced through a duct 41, a manifold 42 and individual pipes or ducts 43 to the upwardly directed jets 38. The manifold 42 may be supported from the top 32 of the caisson and the teeth 34 may be supported by the pipes 43. Preferably the teeth are provided at their lower ends with baffles 44 for the same general purpose as those disclosed in said Pruyn Patent 2,182,094, that is to control the flow of granular material to the lower ends of the hollow teeth.

During the upward flow, through the hollow teeth 34, of the granular material and collected impurities and the discharge of the liquid and solids from the upper ends of the teeth, the granular material will be washed and scoured to separate the impurities from the granular material. After leaving the upper ends of the teeth, the granular material will be further washed and scoured and will eventually settle on the surface of the filter bed, the impurities being left in suspension in the liquid. The granular material or sand discharged from the teeth and settling on the bed also serves to stir up the layer of contaminating solids on the upper surface of the filter bed and to pass them into a state of suspension in the liquid in the caisson.

The dirty liquid or water thus produced must be withdrawn from the caisson and preferably is withdrawn through a suction chamber or box 45 at the top and rear of the caisson. Preferably the chamber 45 extends all of the way across the caisson and the dirty liquid enters the chamber through one or more openings 46 in the front of said chamber just below the caisson top 32 to aid in preventing the sand or other granular material from entering said chamber 45. Preferably the suction box 45 has a top which covers the box except at one position where it connects with the lower end of a pump well 47 which extends above the liquid level in the filter channel. Obviously the width of this pump well is relatively narrow as compared with the width of the caisson and resistance to movement of the caisson is greatly decreased.

The dirty water may be removed through the pump well 47 by means of a suction pump 48 supported from the bridge 35 and this pump may be driven by means of a motor 49 also supported by the bridge. If desired, the pump 48 may be lowered so as to be located in the suction chamber 45 beneath the well 47. The dirty liquid from the pump may be discharged through a pipe line 50 to any suitable location.

Due to the fact that the sand or other granular material passes through each tooth in a substantially straight line and passes therefrom in an upward direction, there is considerable danger that, if no provision be made to prevent it, sand will pass directly from the tops of the teeth directly to the suction chamber 45 and into the same notwithstanding the location of the openings 46 in the front of the suction chamber. This difficulty may be avoided by deflecting the flow of granular material so as to direct the granular material downwardly and lengthen the path of flow from the upper ends of the teeth to the openings in the suction box or chamber 45.

Such deflection of the flow from the upper ends of the teeth 34 may, as illustrated in Fig. 2, be effected by a deflector 51 in the form of an inverted trough extending completely across the caisson 32, that is from one side wall 27 to the other. Said trough is preferably of abrasion-resisting material and may have a cross section in the shape of an inverted flat V with the point of the V a little to the rear of the tops of the teeth so that the flow from the tops of the teeth will be deflected first rearwardly and then downwardly. The sand, or other granular material, thus turned downwardly will act to scour the top of the bed and remove therefrom impurities which will be placed in suspension in the dirty water or liquid. The dirty water, thus freed from sand, will flow through one or more openings 46 into the suction chamber 45, from which the dirty water is removed by the pump 48.

Due to the spacing of the deflector 51 from the upper ends of the teeth 34, the stream of sand and liquid spreads considerably before striking the deflector thus tending to prevent excessive abrasion at a limited number of points on the deflector. Obviously some of the sand flowing upwardly from the teeth will strike sand previously deflected by the deflector and tend to produce a very effective cleaning action.

Figure 5:
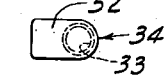
Fig. 5 is a top plan view of part of the structure shown in Fig. 4.
Figure 4:
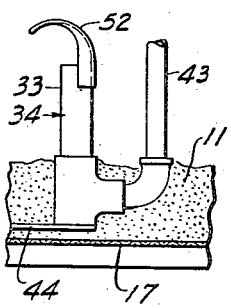
Fig. 4 is a view in side elevation illustrating a modification of a detail.

According to a modification or second form of the invention, the single baffle 51 of Figs. 1, 2 and 3 may be omitted and each tooth 34 may be provided with a deflector 52 shown in Figs. 4 and 5. Each deflector 52 may be of suitable material, for example metal highly resistant to abrasion, and may have a curved portion adapted to fit over the front of a tooth 34 at its top. Above the top of the tooth the deflector curves gradually toward the rear until its is turned downwardly. Also as the deflector curves to the rear, it spreads gradually until it becomes substantially straight in a transverse direction. The deflectors 52 may easily be replaced.

Figure 6:
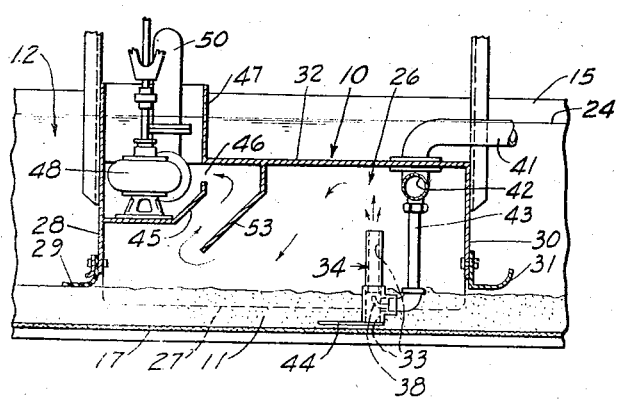
Fig. 6 is a view similar to Fig. 2 but illustrating a modification.

A further modification or third form of the invention is illustrated in Fig. 6 and comprises a baffle or deflector 53 which is downwardly and rearwardly inclined at the rear of the teeth 34. As shown in Fig. 6, the stream of sand from the teeth does not strike the baffle or deflector directly but the dirty water in the caisson is compelled to flow downwardly around the lower edge of the deflector before passing to the pump chamber 45, thus effecting separation of the sand and deposit thereof on the top of the filter bed. Obviously the deflector might be so shaped and positioned as to be struck directly by the sand flowing from the upper ends of the teeth.

It will be evident that, due to the substantially straight passages through the teeth, the abrasion at the interior of the teeth will be minimized, thus enabling the teeth to be used for a long period before replacement. The deflectors are of simple form and can be replaced more easily than the teeth.

It should be understood that various features may be changed and that certain features may be used without others, without departing from the true spirit and scope of the invention.

What I claim is:

1. In a cleaner adapted to travel over a granular filter bed, the combination with a caisson having an open bottom substantially in engagement with the upper surface of said bed and means for discharging dirty liquid from the caisson, of a plurality of hollow teeth extending from the interior of the caisson downwardly to the lower part of said filter bed, each of said teeth having a substantially straight passage therethrough with an inlet at the lower end and an outlet at the upper end of said passage, and deflecting means to direct granular material flowing from the upper ends of said passages downwardly to settle on said filter bed, said deflecting means comprising an inverted trough extending substantially from side to side of the caisson.

2. In a cleaner adapted to travel over a granular filter bed, the combination with a caisson having an open bottom substantially in engagement with the upper surface of said bed and means for discharging dirty liquid from the caisson, of a plurality of hollow teeth extending from the interior of the caisson downwardly to the lower part of said filter bed, each of said teeth having a substantially straight passage therethrough with an inlet at the lower end and an outlet at the upper end of said passage, and deflecting means to direct granular material flowing from the upper ends of said passages downwardly to settle on said filter bed, said deflecting means comprising an inverted trough extending substantially from side to side of the caisson and so positioned as to deflect the granular material rearwardly as well as downwardly.

3. In a cleaner adapted to travel over a granular filter bed, the combination with a caisson having an open bottom substantially in engagement with the upper surface of said bed and means for discharging dirty liquid from the caisson, of a plurality of hollow teeth extending from the interior of the caisson downwardly to the lower part of said filter bed, each of said teeth having a substantially straight passage therethrough with an inlet at the lower end and an outlet at the upper end of said passage, and deflecting means to direct granular material flowing from the upper ends of said passages downwardly to settle on said filter bed, said deflecting means comprising an inverted trough extending substantially from side to side of the caisson and having at its interior two plane surfaces meeting in a line extending longitudinally of the trough.

JOHN B. GOLDSBOROUGH.